(12) United States Patent
Chang et al.

(10) Patent No.: US 7,772,824 B2
(45) Date of Patent: Aug. 10, 2010

(54) CONTROL METHOD FOR ADJUSTING LEADING EDGE BLANKING TIME IN POWER CONVERTING SYSTEM

(75) Inventors: Yuan-Wen Chang, Hsin-Chu (TW); Yu-Bin Wang, Hsin-Chu (TW); Ming-Nan Chuang, Hsin-Chu (TW); Yu-Chuan Liu, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 12/573,885

(22) Filed: Oct. 6, 2009

(65) Prior Publication Data

US 2010/0026268 A1      Feb. 4, 2010

Related U.S. Application Data

(63) Continuation of application No. 11/952,144, filed on Dec. 7, 2007, now Pat. No. 7,619,909.

(51) Int. Cl.
*H02H 7/122* (2006.01)
*H02M 3/335* (2006.01)

(52) U.S. Cl. .................. 323/284; 323/288; 363/56.1
(58) Field of Classification Search .............. 323/282, 323/284, 285, 288; 363/21.01, 21.04, 21.1, 363/21.11, 21.12, 21.18, 56.1, 97
See application file for complete search history.

(56) References Cited

U.S. PATENT DOCUMENTS

| | | | | |
|---|---|---|---|---|
| 6,144,245 | A * | 11/2000 | Balogh | 327/380 |
| 6,219,262 | B1 * | 4/2001 | Burgyan | 363/97 |
| 7,151,679 | B2 * | 12/2006 | Strijker | 363/21.01 |
| 7,619,909 | B2 * | 11/2009 | Chang et al. | 363/56.1 |

* cited by examiner

*Primary Examiner*—Gary L Laxton
(74) *Attorney, Agent, or Firm*—Winston Hsu

(57) ABSTRACT

A control method for adjusting leading edge blanking time in a power converting system is disclosed. The control method includes: receiving a feedback signal relative to a load connected to an output terminal of the power converting system; determining the leading edge blanking time to be a first value if the feedback signal has a magnitude about a first voltage; and determining the leading edge blanking time to be a second value if the feedback signal has a magnitude about a second voltage, wherein the first value is smaller than the second value, and the first voltage is greater than the second voltage.

13 Claims, 5 Drawing Sheets

US 7,772,824 B2

CONTROL METHOD FOR ADJUSTING LEADING EDGE BLANKING TIME IN POWER CONVERTING SYSTEM

CROSS REFERENCE TO RELATED APPLICATIONS

This continuation application claims the benefit of co-pending U.S. application Ser. No. 11/952,144, filed on Dec. 7, 2007 and incorporated herein by reference.

BACKGROUND OF THE INVENTION

1. Field of the Invention

The present invention relates to a control method for adjusting leading edge blanking time, and more particularly, to a control method for adjusting a leading edge blanking time in a power converting system.

2. Description of the Prior Art

FIG. 1 is a diagram of a flyback converter 10 according to the prior art. A pulse-width modulation (PWM) control chip 100 outputs a PWM signal $V_{PWM}$ at an output pin OUT to control the turn-on and turn-off of a power switch 101 for transforming an input voltage Vin into an output voltage Vout. In order to prevent a large primary-side current Ip of the flyback converter 10 from damaging elements, the PWM control chip 100 further detects a voltage level Vcs (Vcs=Rs× Ip, which is generated by the primary-side current Ip flowing through a sensing resistor Rs) at a current sensing pin CS. When the voltage level Vcs reaches a predetermined reference voltage level for over-current protection, the PWM control chip 100 enables an over-current protection mechanism. The output pin OUT stops outputting the PWM signal $V_{PWM}$ to turn off the power switch 101, which cuts off the primary-side current Ip and thereby prevents the over-current phenomenon.

However, a spike is generated at the transient when turning on the power switch 101, which makes the voltage level Vcs detected by the current sensing pin CS rise immediately. Therefore, a fault trigger in the over-current protection mechanism of the PWM control chip 100 may happen. If the power switch 101 is wrongly turned off without an over-current phenomenon, the operations of the flyback converter 10 will be influenced. One solution is to add a leading edge blanking mechanism to the PWM control chip 100. The voltage signal Vcs detected by the current sensing pin CS is ignored (i.e., the over-current protection mechanism is not enabled) by the PWM control chip 100 within a leading edge blanking time, which begins at the moment when the power switch 101 is turned on.

Presently, most of the PWM control chips with current mode control have a built-in control circuit with a fixed leading edge blanking time. However, the control circuit with the fixed leading edge blanking time exhibits two disadvantages listed below:

When the power switch 101 is turned off, its drain voltage is $Vd=Vin+(Vout/N)+Ip\times(Lk/Cd)^{1/2}$, wherein N is a turn ratio between the secondary-side winding and the primary-side winding of the transformer, Lk is a leakage inductor of the primary-side winding of the transformer, and Cd is the stray capacitor of the power switch 101. When the flyback converter 10 is turned on, a secondary-side current Is charges an output capacitor Co to increase the output voltage Vout from zero gradually. If the flyback converter 10 is at full load condition, the output voltage Vout will rise up slower. As can be known from the equation of Vout=L×(dIs/dt), it's very difficult to fully release energy from the primary-side winding of the transformer T1 to the secondary-side winding of the transformer T1. Because the power switch 101 is turned on within the leading edge blanking time, the primary-side current Ip accumulates a huge value if the fixed leading edge blanking time is too long. If the input voltage Vin of the flyback converter 10 is high, the excessively high drain voltage Vd of the power switch 101 may damage the power switch 101.

Most of the PWM control chips have a burst mode function. When the system is at light load condition, the PWM control chip 100 enters burst mode. At this time, if the voltage value of the feedback signal $V_{COMP}$ of the PWM control chip 100 is smaller than a threshold level, the output pin OUT stops outputting the PWM signal $V_{PWM}$. When the voltage value of the feedback signal $V_{COMP}$ is greater than the threshold level, the system enters a normal current mode control and the output pin OUT starts to output the PWM signal $V_{PWM}$, which makes the waveform of the feedback signal $V_{COMP}$ a sine-wave-like pattern nearby the threshold level. When the PWM control chip 100 enters burst mode, the energy delivered from the input voltage Vin to the system may be smaller if the leading edge blanking time is too short. Therefore, the frequency of the sine-wave-like waveform of the feedback signal $V_{COMP}$ gets higher, resulting in a higher switching loss and thus making the power-saving capability of the system poor.

SUMMARY OF THE INVENTION

It is one of the objectives of the claimed invention to provide a control method for adjusting leading edge blanking time, which is applied to a power converting system to solve the abovementioned problems. The control method adjusts a leading edge blanking time according to a feedback signal relative to a load connected to an output terminal of the power converting system to make an over-current protection mechanism of the power converting system disabled within the leading edge blanking time. The control method comprises: receiving a feedback signal relative to a load connected to an output terminal of the power converting system; determining the leading edge blanking time to be a first value if the feedback signal has a magnitude about a first voltage; and determining the leading edge blanking time to be a second value if the feedback signal has a magnitude about a second voltage, wherein the first value is smaller than the second value, and the first voltage is greater than the second voltage.

Moreover, in another embodiment, the control method comprises: generating a charging current according to the feedback signal; providing a capacitor; providing a switch coupled to the capacitor, when a power switch of the power converting system is turned on, the switch is turned off to make the charging current charge the capacitor, and when the power switch is turned off, the switch is turned on to make the capacitor discharged; comparing the voltage of the capacitor with a reference voltage; and disabling the over-current protection mechanism of the power converting system when the charging current charges the capacitor until the voltage of the capacitor reaches a reference voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
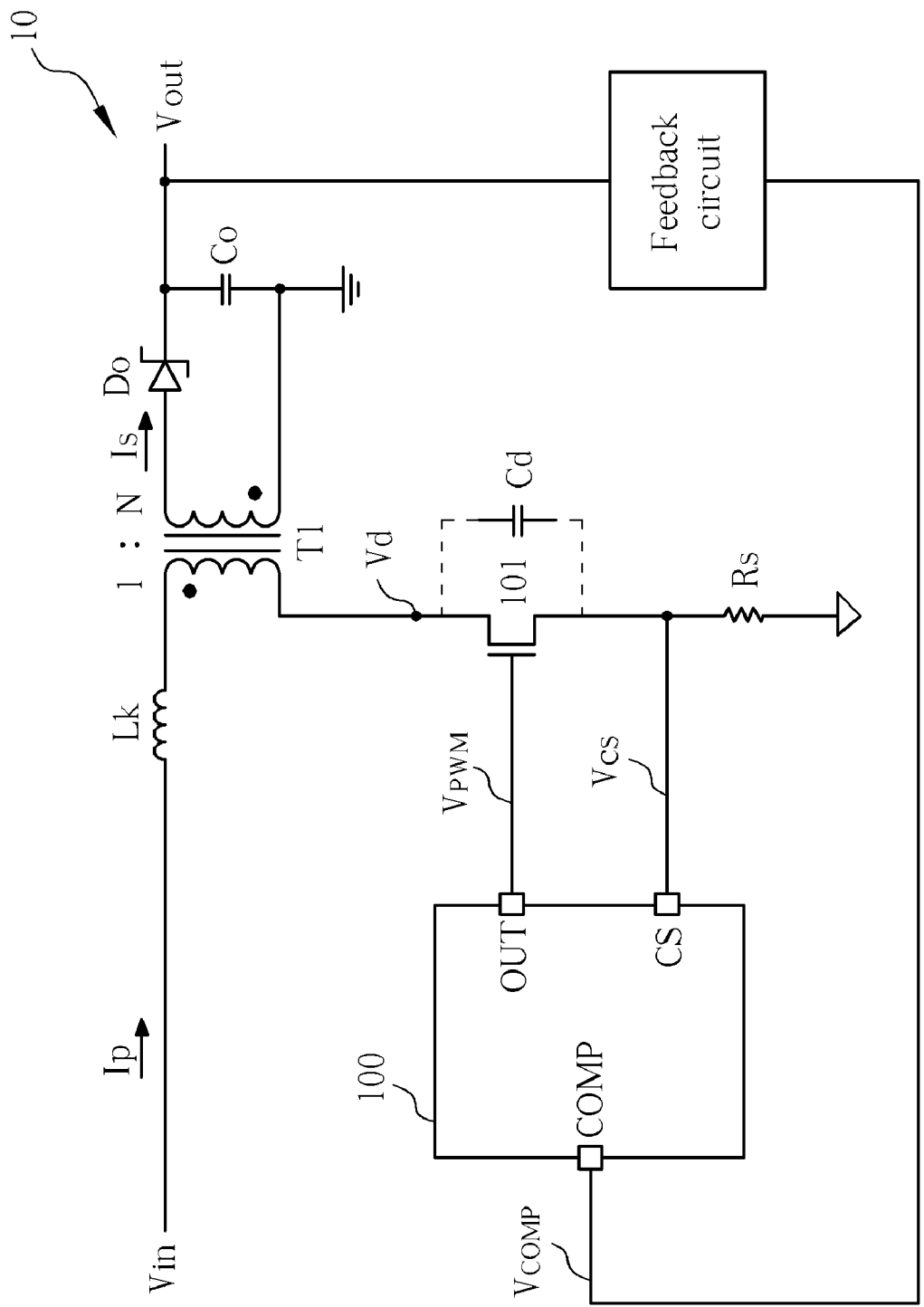
FIG. 1 is a diagram of a flyback converter according to the prior art.
Figure 2A:
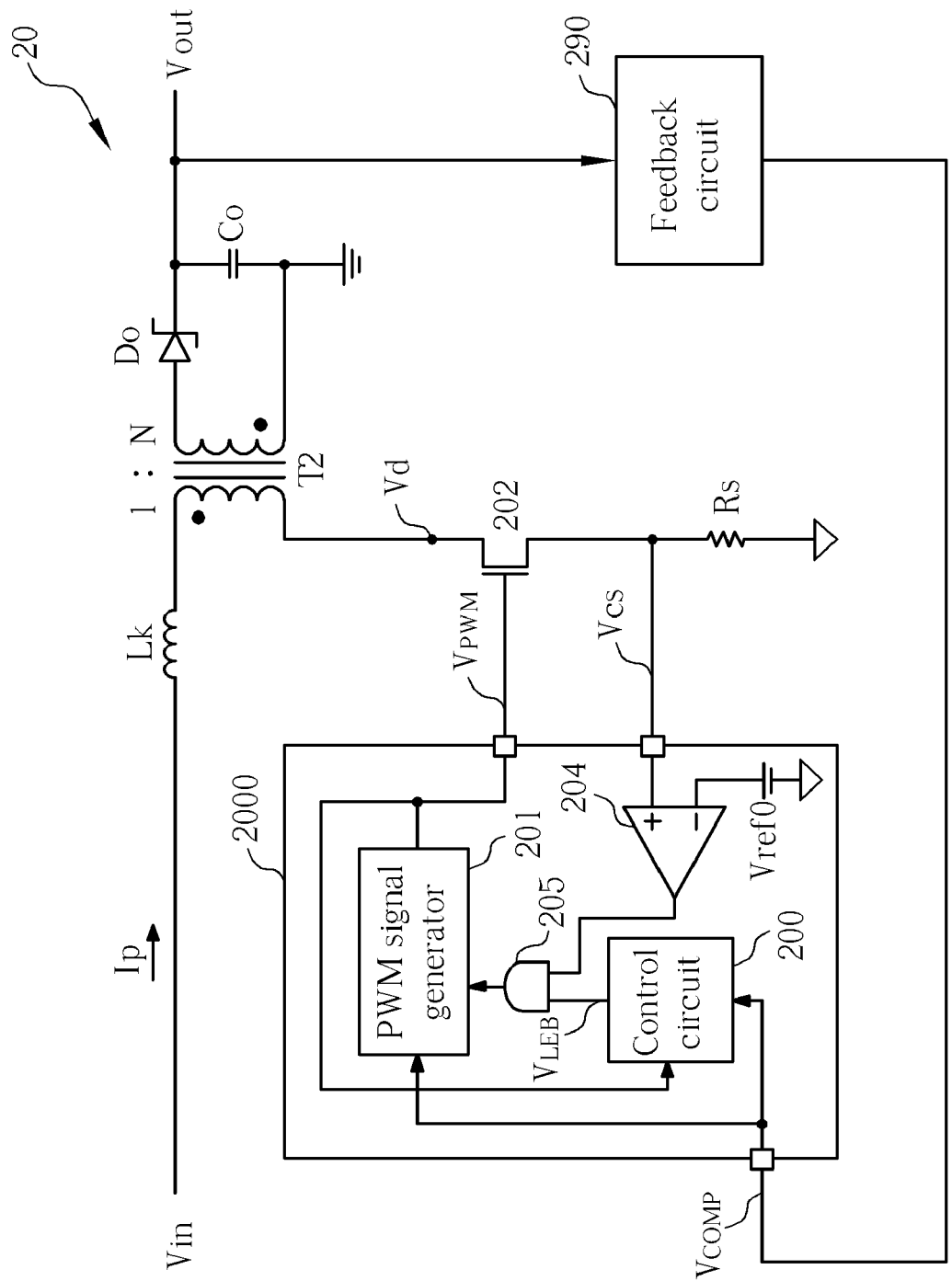
FIG. 2(a) is a diagram showing a power converting system for adjusting leading edge blanking time according to the present invention.

FIG. 2(a) is a diagram showing a power converting system 20 for adjusting leading edge blanking time according to the present invention. The power converting system 20 includes a transformer T2, a power switch 202, a current sensing resistor Rs, a feedback circuit 290, and a PWM controller 2000. The feedback circuit 290 outputs a feedback signal $V_{COMP}$ having a voltage value proportional to a load connected to an output terminal of the power converting system 20.

The PWM controller 2000 includes a control circuit 200 for adjusting leading edge blanking time, a PWM signal generator 201, an over-current comparator 204, and a logic gate 205. The PWM signal generator 201 generates a PWM signal $V_{PWM}$ to control the power switch 202 according to the feedback signal $V_{COMP}$.

The over-current comparator 204 has a first input terminal (inverting input terminal) and a second input terminal (non-inverting input terminal), wherein the first input terminal receives an over-current protection reference voltage Vref0 and the second input terminal receives a sensing voltage Vcs. Vcs=Rs×Ip, which is generated by the primary-side current Ip flowing through the sensing resistor Rs.

Figure 2B:
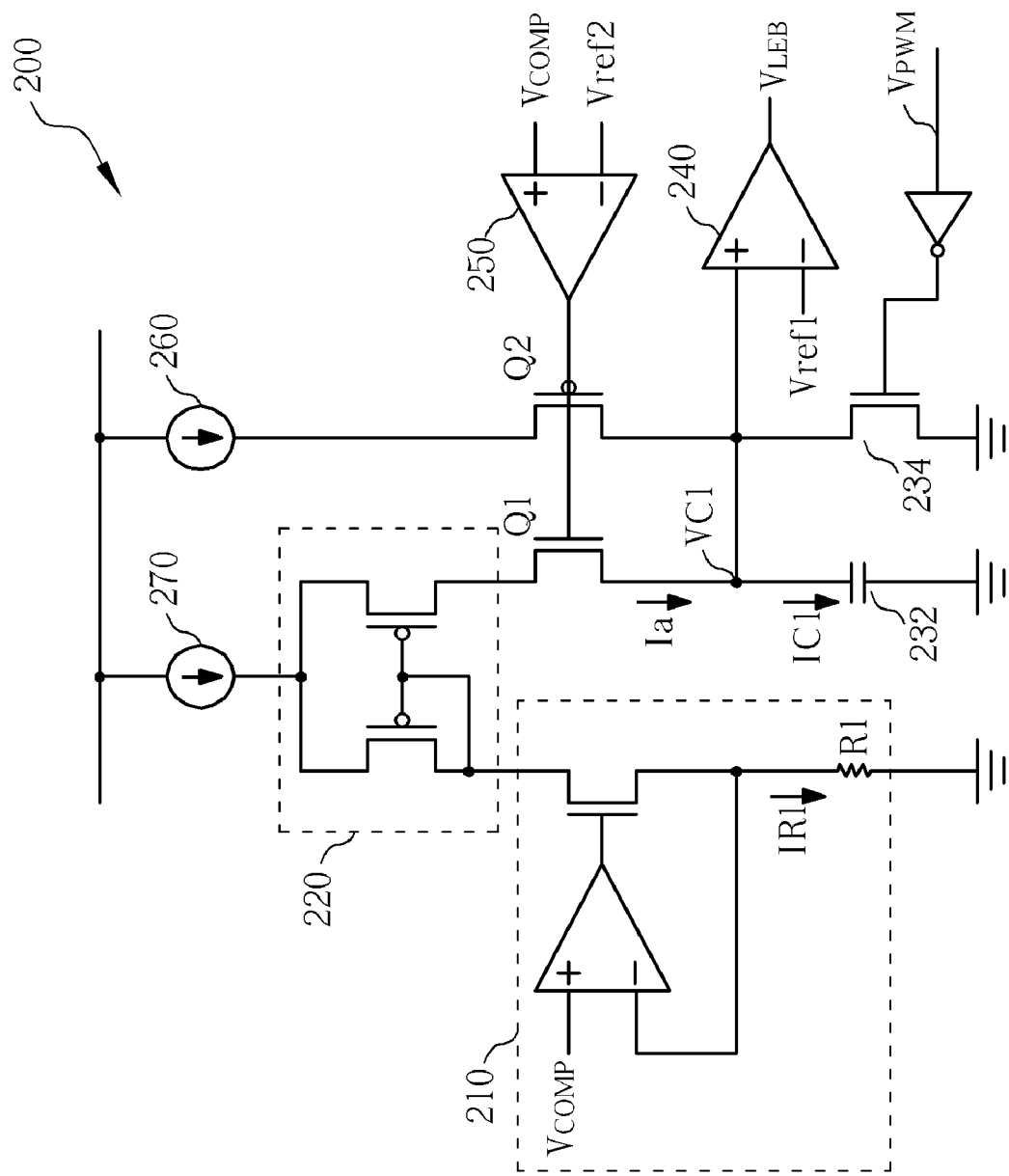
FIG. 2(b) is a diagram showing a control circuit for adjusting leading edge blanking time according to a first embodiment of the present invention.

FIG. 2(b) is a diagram showing the control circuit 200 for adjusting a leading edge blanking time according to a first embodiment of the present invention. The control circuit 200 includes a voltage-to-current converting circuit 210, a current mirror 220, a capacitor 232, a charge/discharge switch 234, a first comparator 240, a second comparator 250, a first current source 260, and a second current source 270.

The voltage-to-current converting circuit 210 generates a first current IR1 proportional to the voltage value of the feedback signal $V_{COMP}$ (IR1=$V_{COMP}$/R1). The current mirror 220 generates a second current Ia identical to the first current IR1. The voltage-to-current converting circuit 210 and the current mirror 220 constitute a variable charging current generating circuit.

When the power switch 202 is turned on (i.e., the PWM signal $V_{PWM}$ is at logic high voltage), the charge/discharge switch 234 (an NMOS transistor) is turned off. A charging current IC1 charges the capacitor 232, wherein the charging current IC1 is provided by the second current Ia at this time. When a voltage VC1 of the capacitor 232 is charged to the reference voltage Vref1 of the first comparator 240, an output signal $V_{LEB}$ of the first comparator 240 changes from logic low into logic high to make the output signal of the logic gate 205 not fixed at logic low (please refer to FIG. 2(a)). In other words, the output signal of the over-current comparator 204 is delivered to the PWM signal generator 201 through the logic gate 205. At this time, if the sensing voltage Vcs reaches the voltage level of the over-current protection reference voltage Vref0, the PWM signal $V_{PWM}$ outputted from the PWM signal generator 201 changes from logic high to logic low according to the output signal with logic high voltage outputted from the over-current comparator 204, and the power switch 202 changes from turn-on state into turn-off state.

When the power switch 202 is turned off (i.e., the PWM signal $V_{PWM}$ is at logic low voltage), the charge/discharge switch 234 is turned on. Therefore, the capacitor 232 discharges through the charge/discharge switch 234 until the voltage VC1 of the capacitor 232 decreases to zero.

A time interval from the time the power switch 202 is turned on, which results in the capacitor 232 starting to charge, until the time the voltage VC1 of the capacitor 232 reaches the reference voltage Vref1 of the first comparator 240 is called the leading edge blanking time $T_{LEB}$. Within the leading edge blanking time $T_{LEB}$, the output signal $V_{LEB}$ of the first comparator 240 is at logic low voltage, which fixes the output signal of the logic gate 205 at logic low voltage. In this time, if the sensing voltage Vcs reaches the voltage level of the over-current protection reference voltage Vref0, a signal with logic high voltage at the output terminal of the over-current comparator 204 can't be delivered to the PWM signal generator 201 through the logic gate 205. The PWM signal $V_{PWM}$ outputted from the PWM signal generator 201 still maintains at logic high voltage and the power switch 202 is still turned on.

If the voltage value of the feedback signal $V_{COMP}$ decreases, both the first current IR1 and the second current Ia decrease. When the voltage value of the feedback signal $V_{COMP}$ is smaller than a first threshold value Vth1 (that is, the reference voltage Vref2 of the second comparator 250), the second comparator 250 outputs a logic low signal to turn off a transistor Q1 and turn on a transistor Q2. At this time, the charging current IC1 is provided by a first current source 260, and the charging current IC1 is restricted at a minimum value, i.e., the current value of the first current source 260. After the power switch 202 is turned on, the voltage VC1 of the capacitor 232 rises to the reference voltage Vref1 of the first comparator 240 with a slowest speed. Thus, the leading edge blanking time $T_{LEB}$ is restricted at a fixed maximum value. Therefore, when the voltage value of the feedback signal $V_{COMP}$ decreases to a very small value, the leading edge blanking time $T_{LEB}$ being too long beyond a reasonable range can be avoided.

If the voltage value of the feedback signal $V_{COMP}$ increases, both the first current IR1 and the second current Ia increase. When the voltage value of the feedback signal $V_{COMP}$ is greater than a second threshold value Vth2, a sum of the current values of the first current IR1 and the second current Ia exceeds the current value of a second current source 270. Due to the second current source 270 being unable to provide more current anymore, through the operation of the current mirror 220, both of the first current IR1 and the second current Ia are clamped at a half of the current value of the second current source 270. Hence, the second threshold value Vth2 is equal to [(½)×(the current value of the second current source 270)×(the resistance R1)]. At this time, the transistor Q1 is turned on and the transistor Q2 is turned off (when the voltage value of the feedback signal $V_{COMP}$ is greater than the reference voltage Vref2 of the second comparator 250, the second comparator 250 outputs a logic high signal to turn on the transistor Q1 and turn off the transistor Q2). The charging current IC1 is equal to the second current Ia, and the charging current IC1 has a maximum value at this time, i.e., a half of the current value of the second current source 270. After the power switch 202 is turned on, the voltage VC1 of the capacitor 232 rises to the reference voltage Vref1 of the first comparator 240 with a fastest speed. Thus the leading edge blanking time $T_{LEB}$ is restricted at a fixed minimum value. When the voltage value of the feedback signal $V_{COMP}$ increases to a very large value, the leading edge blanking time $T_{LEB}$ being too short beyond a reasonable range can be avoided.

When the voltage value of the feedback signal $V_{COMP}$ is between the first threshold value Vth1 (i.e., the reference voltage Vref2) and the second threshold value Vth2, the transistor Q1 is turned on and the transistor Q2 is turned off. The charging current IC1 is the second current Ia; that is, the current value of the second current Ia is equal to that of the first current IR1, and both are $V_{COMP}$/R1. Therefore, when the voltage value of the feedback signal $V_{COMP}$ becomes larger, the charging current IC1 becomes larger and the leading edge blanking time $T_{LEB}$ becomes shorter. That is to say, the leading edge blanking time $T_{LEB}$ and the voltage value of the feedback signal $V_{COMP}$ are inversely proportional.

Figure 3:
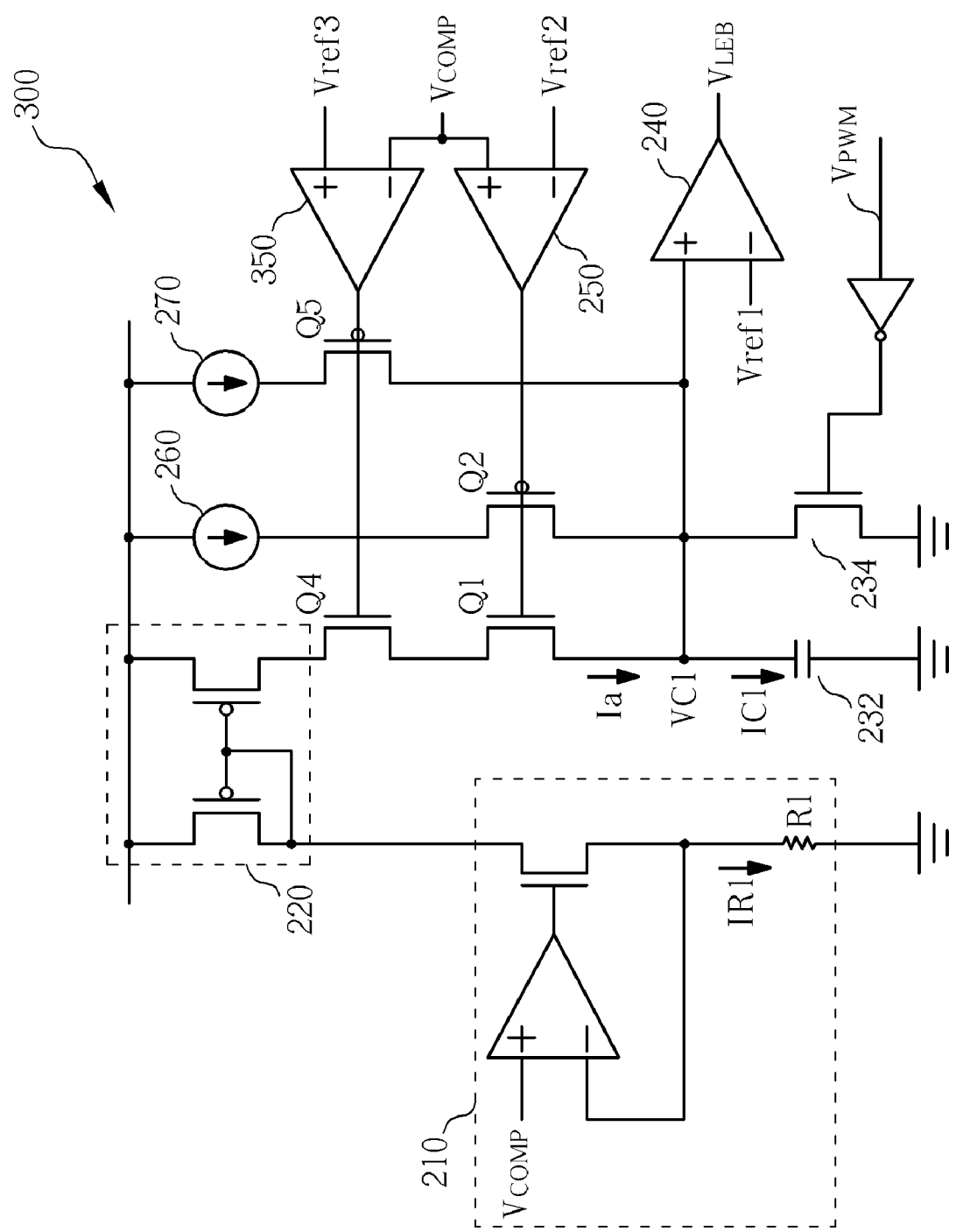
FIG. 3 is a diagram showing a control circuit for adjusting leading edge blanking time according to a second embodiment of the present invention.

FIG. 3 is a diagram showing a control circuit 300 for adjusting leading edge blanking time according to a second embodiment of the present invention. Compared with the control circuit 200 for adjusting leading edge blanking time according to the first embodiment, a third comparator 350 having a reference voltage Vref3 is added into the control circuit 300. Moreover, the configuration position of the second current source 270 is different from that in the first embodiment.

In the second embodiment, the reference voltage Vref3 is used as the second threshold value Vth2 and the reference voltage Vref2 is used as the first threshold value Vth1. When the voltage value of the feedback signal $V_{COMP}$ is between the reference voltage Vref2 and the reference voltage Vref3 (Vth1<$V_{COMP}$<Vth2), both the second comparator 250 and the third comparator 350 output a logic high signal to turn on the transistors Q1 and Q4 and to turn off the transistors Q2 and Q5. The charging current IC1 is provided by the second current Ia, and the current value of the second current Ia is equal to the current value of the first current IR1, both are $V_{COMP}$/R1. Therefore, when the voltage value of the feedback signal $V_{COMP}$ becomes larger, the charging current IC1 becomes larger and the leading edge blanking time $T_{LEB}$ becomes shorter. That is to say, the leading edge blanking time $T_{LEB}$ and the voltage value of the feedback signal $V_{COMP}$ are inversely proportional.

When the voltage value of the feedback signal $V_{COMP}$ is smaller than the first threshold Vth1 (i.e., the reference voltage Vref2), the second comparator 250 outputs a logic low signal and the third comparator 350 outputs a logic high signal to turn on the transistors Q2 and Q4 and to turn off the transistors Q1 and Q5. The charging current IC1 is provided by the first current source 260 and is restricted at a minimum value; i.e., the current value of the first current source 260. After the power switch 202 is turned on, the voltage VC1 of the capacitor 232 rises to the reference voltage Vref1 of the first comparator 240 with a slowest speed. Thus the leading edge blanking time $T_{LEB}$ is restricted at a fixed maximum value. When the voltage value of the feedback signal $V_{COMP}$ decreases to a very small value, the leading edge blanking time $T_{LEB}$ being too long beyond a reasonable range can be avoided.

When the voltage value of the feedback signal $V_{COMP}$ is greater than the reference voltage Vref3, the transistors Q1 and Q5 are turned on and the transistors Q2 and Q4 are turned off. The charging current IC1 is provided by the second current source 270 and is restricted at a maximum value, i.e., the current value of the second current source 270. After the power switch 202 is turned on, the voltage VC1 of the capacitor 232 rises to the reference voltage Vref1 of the first comparator 240 with a fastest speed. Thus the leading edge blanking time $T_{LEB}$ is restricted at a fixed minimum value. When the voltage value of the feedback signal $V_{COMP}$ increases to a very large value, the leading edge blanking time $T_{LEB}$ being too short beyond a reasonable range can be avoided.

Figure 4:
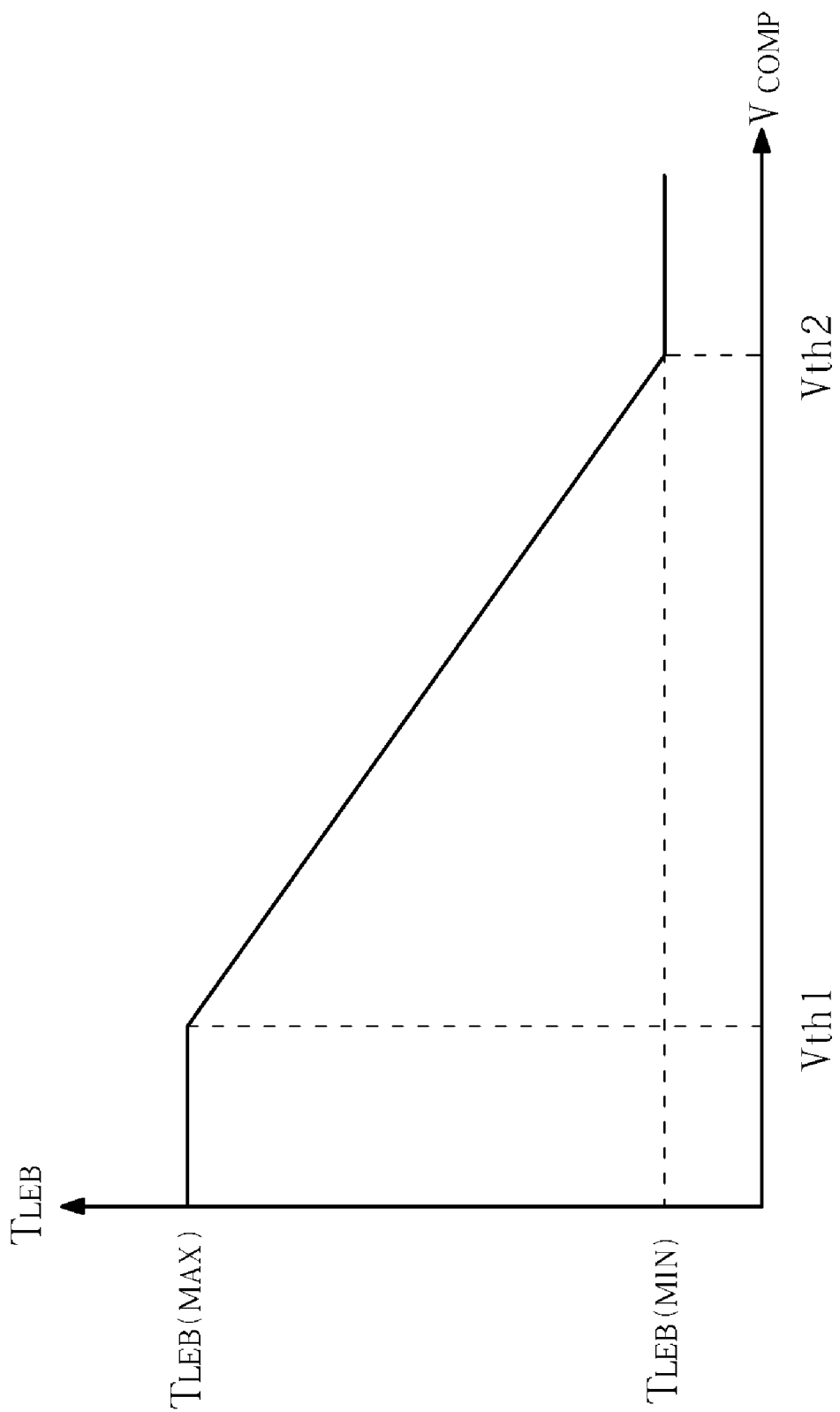
FIG. 4 is a diagram showing a relationship between the leading edge blanking time and the voltage value of the feedback signal of the power converting system of the present invention.

FIG. 4 is a diagram showing a relationship between the leading edge blanking time $T_{LEB}$ and the voltage value of the feedback signal $V_{COMP}$ of the power converting system 20 according to the first and second embodiments of the present invention. When the voltage value of the feedback signal $V_{COMP}$ is smaller than the first threshold value Vth1, the leading edge blanking time $T_{LEB}$ has a fixed maximum value $T_{LEB(MAX)}$. When the voltage value of the feedback signal $V_{COMP}$ is greater than the second threshold value Vth2, the leading edge blanking time $T_{LEB}$ has a fixed minimum value $T_{LEB(MIN)}$. When the voltage value of the feedback signal $V_{COMP}$ is between the first threshold value Vth1 and the second threshold value Vth2 (Vth1<$V_{COMP}$<Vth2), the leading edge blanking time $T_{LEB}$ is inversely proportional to the voltage value of the feedback signal $V_{COMP}$.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for adjusting leading edge blanking time in a power converting system to make an over-current protection mechanism of the power converting system disable within the leading edge blanking time, the method comprising:
    receiving a feedback signal relative to a load connected to an output terminal of the power converting system;
    determining the leading edge blanking time to be a first value if the feedback signal has a magnitude about a first voltage; and
    determining the leading edge blanking time to be a second value if the feedback signal has a magnitude about a second voltage;
    wherein the first value is smaller than the second value, and the first voltage is greater than the second voltage.

2. The control method for adjusting leading edge blanking time of claim 1, wherein the leading edge blanking time decreases as long as the magnitude of the feedback signal increases when the magnitude of the feedback signal is about between the first and second voltages.

3. The control method for adjusting leading edge blanking time of claim 1, further comprising:
    generating a charging current according to the magnitude of the feedback signal;
    when a power switch of the power converting system is turned on, making the charging current charge a capacitor;
    when the power switch is turned off, making the capacitor discharged;
    comparing the voltage of the capacitor with a reference voltage; and
    disabling the over-current protection mechanism of the power converting system when the charging current charges the capacitor until the voltage of the capacitor reaches a reference voltage.

4. The control method for adjusting leading edge blanking time of claim 3, wherein the charging current corresponding to the feedback signal having a magnitude about the first voltage is greater than the charging current corresponding to the feedback signal having a magnitude about the second voltage.

5. A control method for adjusting leading edge blanking time, applied to a power converting system, according to a feedback relative to a load connected to an output terminal of the power converting system to make an over-current protection mechanism of the power converting system disabled within the leading edge blanking time, the method comprising:

generating a charging current according to the feedback signal;

providing a capacitor;

providing a switch coupled to the capacitor, wherein when a power switch of the power converting system is turned on, the switch is turned off to make the charging current charge the capacitor, and when the power switch is turned off, the switch is turned on to make the capacitor discharged;

comparing the voltage of the capacitor with a reference voltage; and disabling the over-current protection mechanism of the power converting system when the charging current charges the capacitor until the voltage of the capacitor reaches a reference voltage.

6. The control method for adjusting leading edge blanking time of claim 5, further comprising:

charging the capacitor with a fixed minimum value of the charging current when the power switch is turned on if the voltage value of the feedback signal is smaller than a threshold value.

7. The control method for adjusting leading edge blanking time of claim 6, wherein the fixed minimum value of the charging current is provided by a current source.

8. The control method for adjusting leading edge blanking time of claim 5, further comprising:

charging the capacitor with a fixed maximum value of the charging current when the power switch is turned on if the voltage value of the feedback signal is greater than a threshold value.

9. The control method for adjusting leading edge blanking time of claim 8, wherein the fixed maximum value of the charging current is provided by a current source.

10. The control method for adjusting leading edge blanking time of claim 5, wherein the switch is controlled by a pulse-width modulation signal.

11. The control method for adjusting leading edge blanking time of claim 5, wherein the method for generating the charging current according to the feedback signal comprises:

providing a voltage-to-current converting circuit for generating a reference current according to the feedback signal with; and providing a current mirror for generating the charging current proportional to the reference current.

12. The control method for adjusting leading edge blanking time of claim 11, wherein the reference current proportional to the voltage value of the feedback signal.

13. A method for controlling a power converting system, the power converting system comprising a transformer, a feedback circuit coupled to an output terminal of the power converting system, a power switch coupled in serial to a primary-side winding of the transformer, a pulse-width modulation signal generator, and a over-current protection mechanism for turning off the power switch when a current flowing through the primary-side winding is greater than a predetermined value, the method comprising:

generating a feedback signal from the feed back circuit, the feedback signal relative to a load connected to the output terminal of the power converting system;

generating a pulse-width modulation signal and determining a duty cycle thereof from the pulse-width modulation signal generator according to the feedback signal, for controlling the power switch; and proving a control circuit for determining a leading edge blanking time to be a first value if the feedback signal has a magnitude about a first voltage, and determining the leading edge blanking time to be a second value if the feedback signal has a magnitude about a second voltage, wherein the first value is smaller than the second value, and the first voltage is greater than the second voltage.

* * * * *